United States Patent [19]

Agrawal et al.

[11] 4,131,666
[45] Dec. 26, 1978

[54] FORMING MOLECULARLY ORIENTED CONTAINERS FROM REHEATED PREFORMS

[75] Inventors: Purushottam D. Agrawal, Mystic; John E. Griesing, East Granby, both of Conn.

[73] Assignee: Monsanto Company, St. Louis, Mo.

[21] Appl. No.: 844,652

[22] Filed: Oct. 25, 1977

[51] Int. Cl.² ............................................. B29C 17/07
[52] U.S. Cl. .................................... 264/521; 264/291
[58] Field of Search ...................... 264/89, 94, 96–99, 264/327, 291; 425/526, 533; 215/1 C

[56] References Cited

U.S. PATENT DOCUMENTS

| | | | |
|---|---|---|---|
| 3,886,247 | 5/1975 | Edwards | 264/94 |
| 3,900,120 | 8/1975 | Sincock | 215/1 C |
| 3,949,038 | 4/1976 | McChesney et al. | 264/94 X |
| 4,044,086 | 8/1977 | McChesney et al. | 264/327 X |

Primary Examiner—Jan H. Silbaugh
Attorney, Agent, or Firm—Michael J. Murphy

[57] ABSTRACT

In forming containers from injection molded preforms of thermoplastic material such as nitrile-based polymers by a process which includes heating the preforms to orientation temperature followed by distension to container form in a mold, the improvement providing reduced thickness variability in lower portions of the containers which involves controlling preform shrinkage during such heating to between about 4 to 15% of the initial length for nitrile materials by maintaining the ratio of average thickness to inside preform surface area within defined limits and then axially and radially stretching such preforms during distension to predetermined levels. Nitrile preforms convertible to such improved quality containers have values of between about 0.005 to 0.011 inch$^{-1}$ for the aforementioned ratio.

7 Claims, 5 Drawing Figures

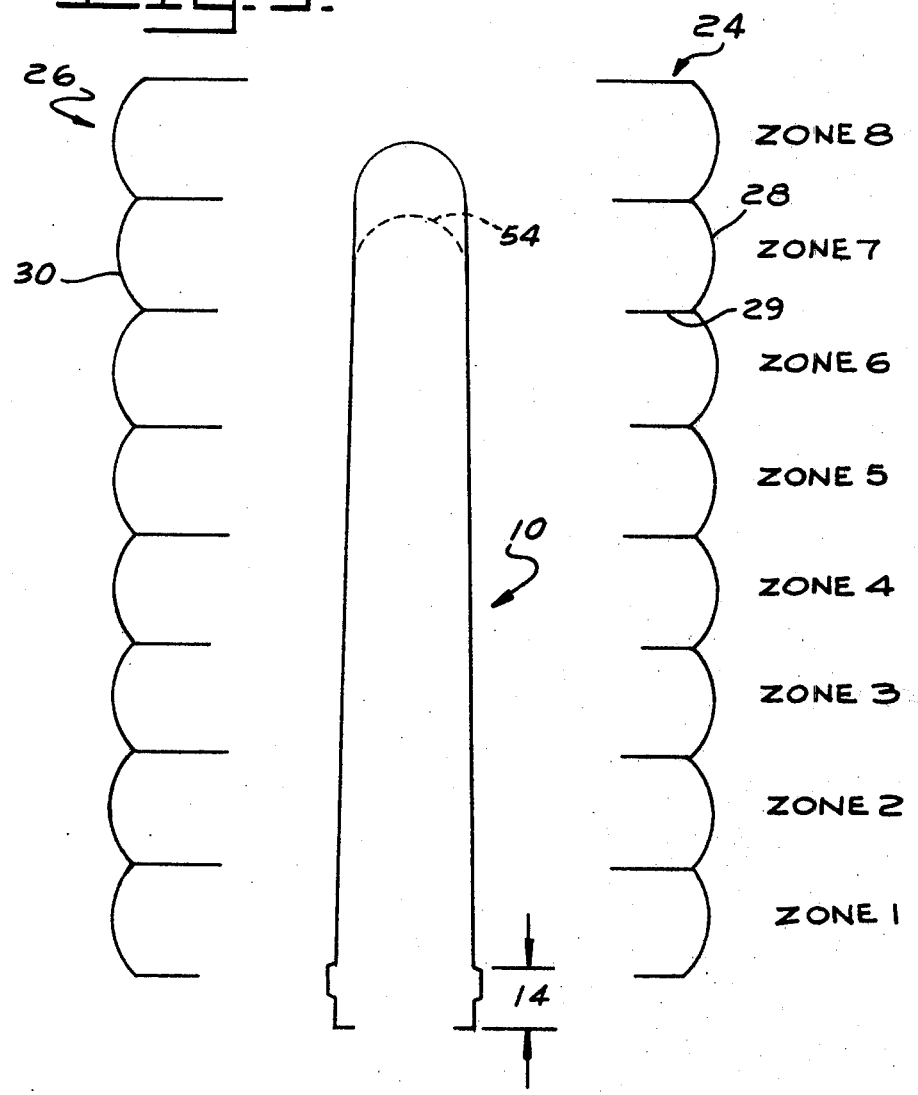

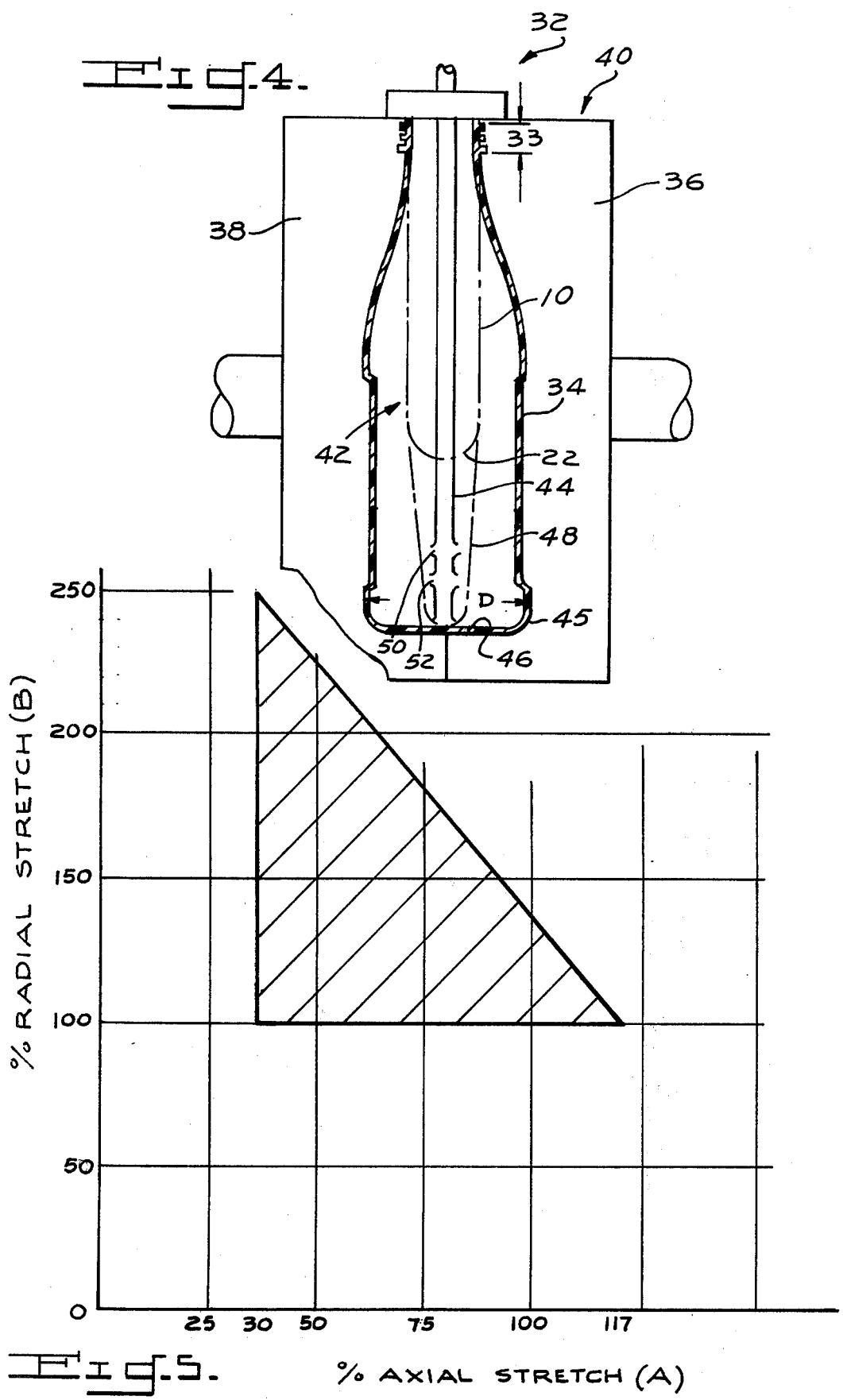

FORMING MOLECULARLY ORIENTED CONTAINERS FROM REHEATED PREFORMS

CROSS REFERENCE TO RELATED COMMONLY OWNED APPLICATION

U.S. Serial No. 790,692, Filed Apr. 15, 1977

BACKGROUND OF THE INVENTION

This invention relates to forming molecularly oriented containers of thermoplastic material, and more particularly to improvements in a preform reheat process for forming containers especially of nitrile thermoplastic material where strength is developed and wall thickness variation minimized especially in the lower container body portions.

Systems for forming containers from preforms reheated to molding temperature and then expanded in a mold are known. If the preform at the time of reforming is at molecular orientation temperature which is usually just above the glass transition temperature zone for the material, the resulting stressed containers have improved impact and burst strength which makes it possible to achieve a significant reduction in weight for a given performance over that required when forming at higher molding temperatures. As also known, thermoplastic materials containing a major proportion of polymerized nitrile-group-containing monomer can be fabricated into oriented containers in this manner and, though usable for packaging a wide variety of products such as foods, pharmaceuticals, personal care, household and industrial compositions and the like, in view of their exceptional strength and barrier properties they are especially desirable for packaging pressurized contents such as carbonated liquids in the form of soft drink beverages and beer.

Preforms of these and similar materials, however, present problems in a reheat process in that the temperature range within which orientation can be developed is quite narrow, as typically exemplified by the modulus-temperature plot of FIG. 6 of U.S. No. 3,814,784, and accordingly reheat process parameters for such materials must be tightly controlled. Consequently, though possible to form oriented high nitrile containers via a preform reheat process, it is important in obtaining high yields with minimum usage of material to precisely control variables such as preform wall thickness and the temperature pattern in the walls at the time of blowing. In this last respect, heat programming is usually employed to locally influence the extent of stretch during container formation. Also, though desirable for control it is difficult and most likely impossible to accurately measure temperature through the thickness of the preform wall after reaching orientation temperature since surface deformation will occur if a probe is used and radiation techniques are only effective to provide surface measurements.

Regarding the manner of forming preforms for such a reheat process, injection molding is preferred to minimize excess wall thickness variation since the plastic is molded in a cavity delimited by two surfaces defining the inside and the outside of the molded part vis-a-vis blowing where the inside surface of the part is not formed to a cavity wall. However, in pumping relatively stiff high nitrile thermoplastic material into an injection mold, frozen strains will inherently develop on cooling. Such strains relieve during reheat resulting in shrinkage along the preform length which has to be dealt with since no way has yet been found to entirely avoid developing such strains in an elongated preform. More specifically, a system employing temperature programming during reheat typically results in a region of the preform exposed to a heat source at one temperature gradually approaching the desired level for such region and then, because of strain relaxation, retracting to a position where the same plastic which had been exposed to the first source is now before a source set at a different temperature. When preforms subject to such overlapping exposure are expanded in the mold substantial thickness variability results which in turn can lead to excessively thin or thick areas and the apparent need for more material in the container than is really necessary for the intended end use.

SUMMARY OF INVENTION

Now, however, improvements have been developed which substantially minimize or overcome such prior art difficulties in a preform reheat process for forming molecularly oriented containers of thermoplastic material.

Accordingly, a principal object of this invention is to provide improvements in such a reheat process which result in improved control of material thickness distribution without sacrifice in strength or increase in material usage in lower portions of the resulting molecularly oriented containers.

Another object is to recognize preform shrink in such a reheat process as a controllable parameter influencing material thickness distribution in the containers.

Another object is to use preform shrink instead of direct temperature measurement as a hot preform quality control parameter in a reheat system for forming molecularly oriented containers.

An additional object is to relate shrink and dimensional characteristics of an injection molded preform and to control such relationship within defined limits in producing high yields of finished, molecularly oriented containers of optimum quality.

A further object is to provide such tubular preforms having predetermined dimensional characteristics within defined limits, which when heated and stretched axially and laterally will yield containers of improved quality in terms of material thickness variability.

Yet a further object is to utilize high nitrile polymers as the thermoplastic material in carrying out the aforementioned objects.

Other objects of this invention will in part be obvious and will in part appear from the following description and claims.

In broad terms these and other objects are accomplished by providing a method of forming containers from injection molded preforms of thermoplastic material which comprises providing preforms having predetermined dimensional characteristics such that shrinkage during heating to orientation temperature is maintainable within predetermined limits, heating such preforms to such temperature by temperature programing while maintaining shrinkage within such limits and then axially and radially stretching such heated preforms beyond predetermined minimum levels but within predetermined total stretch levels to form the containers, whereby strength is developed and thickness variability minimized.

In more specific terms, there is provided in the method of forming containers from injection molded preforms comprising a major proportion of a polymerized nitrile-group-containing monomer, which method includes heating the preforms to molecular orientation temperature followed by axial and radial stretching to container form in a mold, the improvement therein providing reduced thickness variability in lower portions of the containers which comprises, in combination, the steps of controlling shrinkage of the preforms during such heating to between about 4 to 15% of the total initial preform length and then controlling the extent of such stretching according to the relation:

$$\% \text{ axial stretch } (A) = \frac{(\text{container length minus preform length})(100)}{\text{preform length minus preform neck finish length}}$$

$$\% \text{ radial stretch } (B) = \frac{(\text{maximum container diameter minus preform outside diameter})(100)}{\text{preform outside diameter}}$$

wherein:
A is at least about 30;
B is at least about 100; and
A plus B is between about 130 and 280.

From a product standpoint a tubular, injection molded preform comprising a major proportion of a polymerized nitrile-group-containing monomer is provided for forming into container shape which has a value of between about 0.005 to 0.011 inch$^{-1}$ for the ratio:

$$\frac{\text{average thickness}}{\text{body inside surface area}}.$$

BRIEF DESCRIPTION OF THE DRAWINGS

In describing the overall invention, reference will be made to the accompanying drawings wherein:

FIG. 3 is a schematic view of the preform heating step in a reheat process.

FIG. 4 is a schematic elevational view of a stretch-blow assembly converting the preform of FIG. 2 into container form; and FIG. 5 is a graphical representation of the levels of stretch to be used with a nitrile polymer version of the preform of FIG. 2 in forming containers according to FIG. 4.

DETAILED DESCRIPTION OF THE ILLUSTRATED EMBODIMENT

Figure 2:
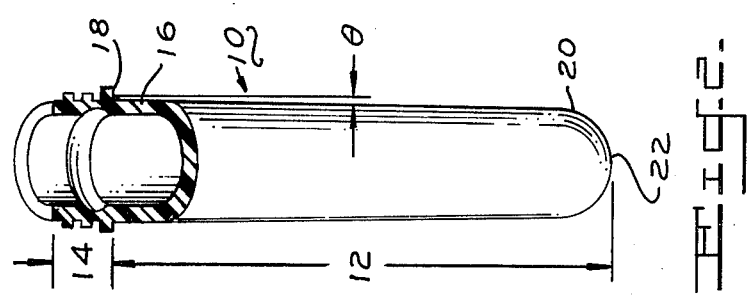
FIG. 2 is a partial, sectional perspective view of a preform configuration functional in the process of the invention.

Referring now to the drawings, an elongated, tubular, injection molded preform 10 of thermoplastic material is shown in FIG. 2 which can be distended into container shape in accordance with the invention. Preform 10 is circular in cross section and includes body portion 12 having closed end 22 which is shown curved in the shape of a hemisphere but could be of alternate configuration such as substantially flat, pointed, concave or the like. Annular finish portion 14 preferably surrounds an opposite open end, is formed to final shape in the preform injection molding step and is not intended for remolding with body 12 during formation of the container. Alternatively, such finish may be formed during the final molding step and in such case the preform during injection molding will be provided with a length increment corresponding to 14 from which such finish is formed in the blow mold. The wall of body 12 may be substantially constant or progressively gradually variable in thickness depending on the nature of the thermoplastic material. Body 12 extends from finish 14 at substantially the same crosswise dimensions and cross sectional shape as that of portion 14 and through such body may vary from this configuration it should not be appreciably greater in such dimensions or different in shape than finish 14. With nitrile polymers body 12 preferably smoothly increase in thickness along its length from a minimum immediately adjacent the finish to a maximum at the junction of the sidewall with hemispherical end 22. The sidewall of body 12 also preferably tapers inwardly at a slight angle $\theta$ on the order of about $\frac{1}{4}$ to $\frac{3}{4}$ degrees to facilitate extraction from the injection mold. Preforms 10 have predetermined dimensional characteristics such that shrinkage during heating in a manner to be described is maintainable within predetermined limits. More specifically, the ratio of average preform thickness to the inside surface area of body 12 lies within a predetermined range to be further described, such average thickness being the arithmetical mean of a.) the thickness at 16 in the vicinity of the junction of the body with finish 14 and b.) the thickness of the wall at 20 at the confluence of the sidewall with closed end 22.

Containers formable according to the invention from preforms 10 may vary widely in size and shape and can be characterized in terms of weight and volume as ranging from between about 0.03 to 0.13 gms./cc. of internal volume. The preferred configuration is a bottle shown as 34 in FIG. 4 which is circular in cross section, has a volume of between about 170 to 3780 cubic centimeters, has a maximum diameter D somewhere along its length and a lower body region where wall thickness control for optimum functional performance is important. Such area in FIG. 4 is shown as heel or chime 45 in the region of the confluence of the bottle sidewall and base.

Referring to FIG. 3, during temperature programmed heating to molecular orientation temperature each preform 10 while supported on a suitable carrier, not shown, is interposed between opposing banks 24, 26 of heating assemblies, each of which comprises a plurality of immediately adjacent, vertically arranged emitter strips typically shown as 28, 30, with reflectors 29 interposed therebetween, each pair of opposing strips being in heat transfer proximity opposite a preform zone, with eight zones shown for the particular preform illustrated. The heating assemblies affecting each zone are set and adjusted to a predetermined temperature to accommodate the particular plastic of the preform via conventional control instrumentation. Such settings are arranged to provide the specifically desired temperature within the overall molecular orientation temperature range for the portion of preform body 12 in such zone, yet while controlling the amount of shrink via such settings which occurs in raising preform 10 to orientation temperature from substantially room temperature. Though a single preform between oppositely arranged heating assemblies is shown and preferred to provide optimum zone temperature control, it is possible to interpose plural rows between opposing assembly pairs when the nature of the thermoplastic material in terms of modulus change with temperature within the orientation range does not dictate a need for unusually precise temperature control. In the illustrated embodiment, finish portion 14 is vertically below and outside the influence of the heating assemblies and therefore no increase in temperature to any substantial extent occurs in such finish during heating since reshaping in the container forming step is not contemplated. If reshaping is contemplated, the portion to form the finish should be within the influence of the heat transfer assemblies.

With respect to FIG. 4, a stretch blow assembly 32 is exemplarily shown for converting a preformm 10 into molecularly oriented container 34. This is accomplished by first enclosing each preform 10 while within the molecular orientation temperature range for the particular thermoplastic material within partible sections 36, 38 of conventional blow mold 40. Next, stretching mechanism 42 is moved over the open end of blow mold 40 whereupon telescopic rod 44 is caused to move to extended position by a suitable mechanism, not shown, in order to draw hemispherical end 22 against base portion 46 of blow mold 40 thereby axially stretching body portion 12 in the manner illustrated in phantom at 48 in FIG. 4. Simultaneously therewith or preferably immediately thereafter, blowing medium such as compressed air is admitted to the interior of the preform through openings 50, 52 in rod 44 to stretch it radially outwardly against the cavity walls to the shape of bottle 34. Under certain circumstances, for example those contemplating non-pressure applications for the finished container, it may not be necessary to provide a separate stretch rod in that the pressue of the blowing medium and the reduced length of the preform versus the container may be adequate to provide the axial stretch desired.

The amount of axial and radial stretch is defined by the configuration of the blow mold cavity in comparison with that of the preform and will vary with the nature of the material involved. In general, if stretch is too great in one direction there will be significant imbalance of orientation in that direction which results in substantially reduced strength in the oppsoite direction, whereas if stretch is too low the reverse is true. For example, with excessive axial stretch good columnar strength is achieve at the expense of hoop strength such that an unwanted hole may develop in the preform during blowing. Such stretch amounts during formation of the container must be greater than predetermined minimums but within predetermined total levels. The area within the cross hatched portion of the graph of FIG. 5 represenrts the axial and radial stretch amounts for preforms comprising a 70/30 weight percent acrylonitrile/styrene polymer which may be successfully empolyed in forming containers according to the invention. The percentage axial and radial stretches as used in FIG. 5 are defined by the formulas:

$$\% \text{ axial stretch } (A) = \frac{(\text{container length minus preform length})(100)}{\text{preform length minus preform neck finish length}}$$

$$\% \text{ radial stretch } (B) = \frac{(\text{maximum container diameter minus preform outside diameter})(100)}{\text{preform outside diameter}}$$

In accordance with the process of this invention, injection molded preforms 10 to be subject to the described heating step are provided which have the ratio of average preform thickness to inside body surface area within predetermined limits such that when program heated to within the orientation temperature of the polymer, measurable shrinkage which is neither excessive nor inconsiderable will occur, the range within which it should be controlled by the heat input from the programmed heaters being established from yields of good quality containers 34 having minimum thickness variability and the necessary levels of thickness in the lower body portions formed by axially and radially stretching in amounts which do not substantially imbalance the resulting orientation in either the axial or radial direction. In arriving at values for such variables as heater temperature settings, oven residence time, preform thickness levels and the extent of stretching in the mold for any particle thermoplastic material, tracking just where the material of a particular part of the preform ends up during stretching may be faciliated by initially physically marking the preforms with a grid pattern and then visually examining such markings and the distribution of plastic thereat in the finished container. As exemplified in FIGS. 1 and 5, when the above considerations are applied to nitrile-based materials, i.e. polymers comprising a major proportion of nitrile-group-containing monomer, the ratio of preform average thickness to preform body inside surface area should be between 0.005 to 0.011 $\text{inch}^{-1}$ which should be controlled on heating to provide between about 4 to 15% and preferably 6 to 15% shrinkage. The stretch parameters as above defined should provide A plus B values of between about 130 to 280 but with the proviso that A be at least about 30 and B be at least about 100. At these stretch levels for such nitrile-based materials, substantial imbalance in the resulting levels of orientation in one direction versus the other is avoided.

Figure 1:
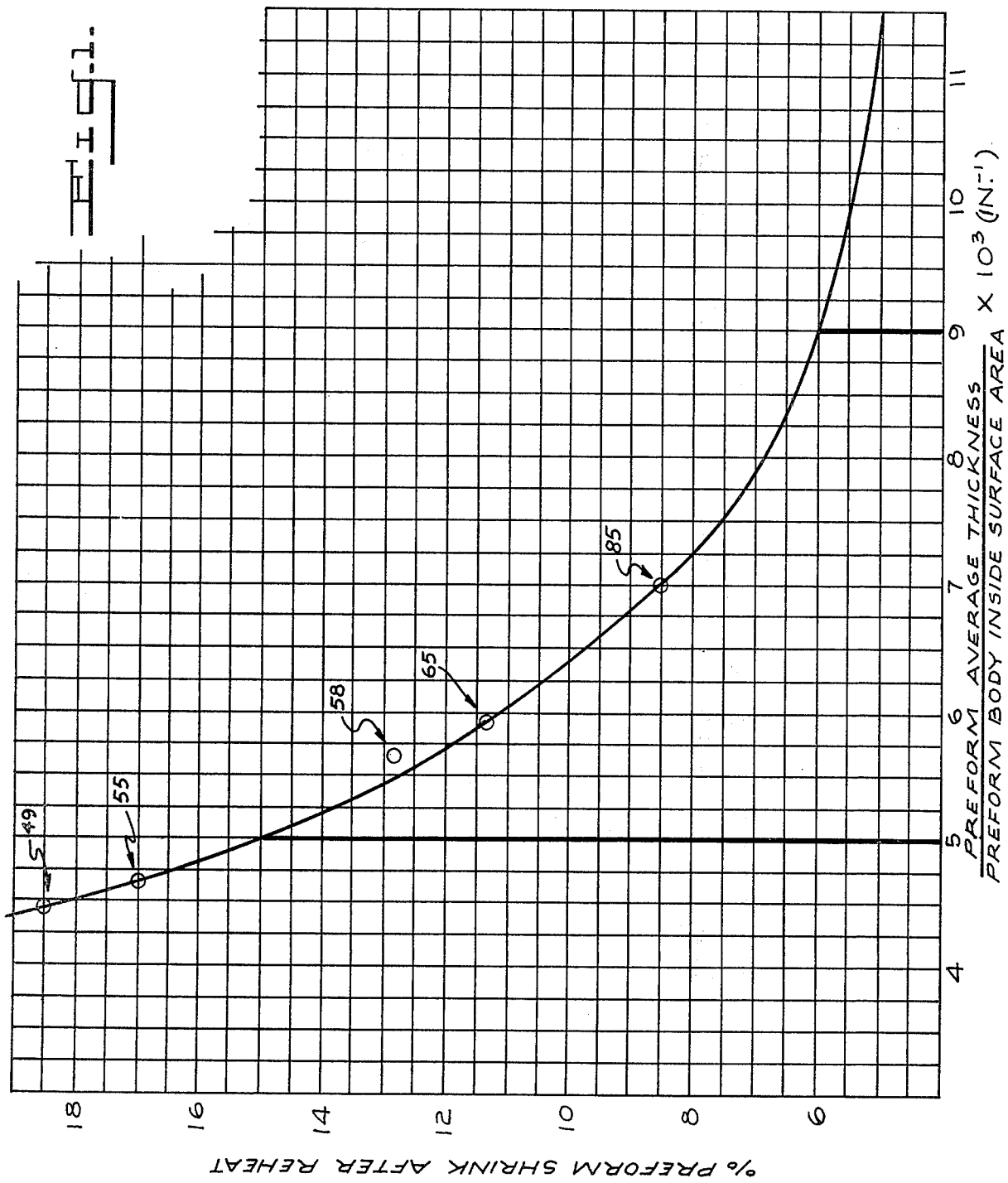
FIG. 1 is a graphical representation in accordance with an embodiment of the invention of the relationship between shrink of a nitrile preform and certain of its dimensional characteristics.

Nitrile-based preforms according to the invention, and as shown in FIG. 1 (the arrowed numbers correspond to various preform weights) satisfy the equation:

$$y = 0.247 \times 10^{-3}(X)^{-2.068}$$

where:

y = % shrink of the preform during heating to orientation temperature and is between 4 to 15 and X = average preform thickness/inside preform body surface area.

The preforms of this invention may be formed by conventional injection molding techniques from any molecularly orientable thermoplastic material. Typical of such materials are polymers and copolymers of styrene, vinyl halides, olefins at at least one aliphatic mono-1-olefin having a maximum of 8 carbon atoms per molecule, and polyesters such as polyethylene terephthalate. The invention has been found particularly applicable to nitrile polymers containing a major proportion of a polymerized nitrile-group-containing monomer, such materials generally comprising from about 50 to about 90% by weight of nitrile monomer units, based on the total polymer weight, wherein the weight percent of nitrile is calculated as acrylonitrile. More particularly, the nitrile polymers used in this invention will comprise at least one nitrile monomer having the formula:

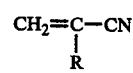

wherein R is hydrogen, an alkyl group having 1 to 4 carbon atoms or a halogen. Such compounds include acrylonitrile, methacrylonitrile, ethacrylonitrile, propacrylonitrile, alpha chloronitrile, etc. as well as mixtures thereof. The most preferred nitriles are acrylonitrile and methacrylonitrile and mixtures thereof.

The nitrile compositions generally will contain one or more comonomers copolymerizable with the nitrile monomers including monovinylidene aromatic hydrocarbon monomers of the formula:

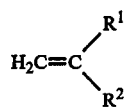

wherein $R^1$ is hydrogen, chlorine or methyl and $R^2$ is an aryl group of 6 to 10 carbon atoms and may also contain substituents such as halogen as well as alkyl groups attached to the aromatic nucleus, e.g. styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

Additional useful comonomers include the lower alpha olefins of from 2 to 8 carbon atoms, e.g. ethylene, propylene, isobutylene, butent-1, pentene-1 and their halogen and aliphatic substituted derivatimes, e.g. vinyl chloride, vinylidene chloride, etc; acrylic acid and methacrylic acid and the corresponding acrylate and methacrylate alkyl esters wherein the alkyl group contains from 1 to 4 carbon atoms, e.g. methyl acrylate, ethyl acrylate, propyl acrylate, methyl methacrylate, etc. Other comonomers which may be used include vinyl esters such as vinyl acetate; and alkyl vinyl ethers wherein the alkyl group contains from 1 to 4 carbon atoms such as methyl vinyl ether, ethyl vinyl ether etc. and mixtures of the foregoing.

Additional comonomers useful in the practice of this invention are those comonomers which contain a mono- or di-nitrile function. Examples of these include methylene glutaronitrile, 2, 4-dicyanobutene-1, vinylidene cyanide, crotonitrile, fumaronitrile, maleonitrile. The preferred comonomers are the monovinylidene aromatic hydrocarbons, lower alpha olefins and acrylic and methacrylic acid and the corresponding acrylate and methacrylate esters with the monovinylidene aromatic hydrocarbons being more particularly preferred. More specifically preferred are styrene and alpha methylstyrene. Another preferred composition is that wherein a terpolymer of nitrile, styrene and vinyl ether is used such as disclosed in U.S. Patent No. 3,863,014.

Optionally, the high nitrile materials may contain from 0 to about 25% by weight of a synthetic or natural rubber component such as polybutadiene, isoprene, neoprene, nitrile rubbers, acrylate rubbers, natural rubbers, acrylonitrile-butadiene copolymers, ethylene-propylene copolymers, chlorinated rubbers, etc., which is used to strengthen or toughen the high nitrile packaging materials. This rubbery component may be incorporated into the polymeric packaging material by any of the methods which are well known to those skilled in the art, e.g., direct polymerization of monomers, grafting the nitrile monomer onto the rubbery backbone, polybend of a rubber graft polymer with a matrix polymer, etc.

The preferred nitrile polymers for container packaging applications requiring excellent oxygen and water vapor barrier properties are those containing from about 55 to about 85% by weight, based on the total polymer weight, of an acrylonitrile and/or methacrylonitrile monomer (wherein the weight percent of methacrylonitrile is calculated as acrylonitrile). When acrylonitrile is used as the sole nitrile monomer the preferred range is from about 60 to 83% by weight whereas with methacrylonitrile the preferred range is from about 70 to about 98% by weight of methacrylonitrile which corresponds to about 55 to about 78% by weight of nitrile monomer calculated as acrylonitrile.

The following examples are given to illustrate the principles and practice of this invention and should not be construed as limitations thereof.

EXAMPLE I

It was decided to form containers in the form of bottles 34 in FIG. 4 from reheated injection molded preforms. Such containers, intended for multiple use applications were to have 950 cc. nominal capacity, a weight of 85 gms., a maximum outside diameter (D in FIG. 4) of 8.3 cms., a total length of 27.9 cms. and a finish length (33 in FIG. 4) of 1.68 cms.

Thermoplastic material in the form of a polymer comprising a 70/30 percent mixture by weight of polymerized acrylonitrile/styrene monomer was injection molded in conventional equipment into preforms configured as in FIG. 2 having the following dimensional characteristics:

total length = 19.6 cms.; finish length = 1.68 cms.
outside diameter (at 20 in FIG.2) = 3.20 cms.
average thickness = 0.399 cms.
¼° taper along preformd body ($\theta$ in FIG. 2)
inside body surface area (i.e. exlcuding that of finish 14 in FIG. 2) = 123 sq. cms.

$$\frac{\text{average thickness}}{\text{body inside surface area}} = 0.00307 \text{ cm.}^{-1} \text{ or } 0.0078 \text{ inch}^{-1}$$

With cavity dimensions of a blow mold set to provide the above bottle configuration, the percentages of axial and radial stretch were calculated at 47% and 159% respectively as follows:

$$\% \text{ axial stretch } (A) = \frac{\text{bottle length minus preform length}(100)}{\text{preform length minus preform neck finish length}}$$

$$A = \frac{27.9 - 19.6}{19.6 - 1.68} (100)$$

$$A = 47\%$$

$$\% \text{ radial stretch } (B) =$$

$$\frac{[\text{maximum container outside diameter minus preform outside diameter (at 20 in FIG. 4)}](100)}{\text{preform outside diameter}}$$

$$B = \frac{(8.3 - 3.2)}{3.2} (100)$$

$$B = 159\%$$

$A$ plus $B = 47 + 159 = 206$

These individual levels of A and B are within the cross hatched area of FIG. 5 with the total being within the previously determined acceptable range of 130 to 280.

While rotating about their lengthwise axes, the body portions of such preforms (12 in FIG. 2) were heated from substantially room temperature to within about 132°–138° C. which is the molecular orientation temperature of the polymer composition of the preforms, in accordance with a heating arrangement as shown in FIG. 3 wherein the temperature of the emitters for the various zones within an enclosing oven were set as follows:

| Zone | 1 | 2 | 3 | 4 | 5 | 6 | 7 | 8 |
|---|---|---|---|---|---|---|---|---|
| Temperature (° C.) | 422 | 383 | 390 | 413 | 409 | 418 | 408 | 327 |

Residence time before the heaters was approximately 196 seconds followed by a conditioning time in air at about 82° C. of 98 seconds to permit the temperature through the preform walls to equilibrate. Representative preform samples on exiting the oven were checked for reduction in length from shrinkage due to strain relaxation and found after appropriate initial manipulation of the controls on the electrical power to the emitter strips to be about 6.65% of the total initial preform length. The remaining preforms after conditioning were introduced to a stretchblow assembly as illustrated in FIG. 4 which included a mold cavity having a surface corresponding in shape and extent to that of the desired end bottle configuration. The preforms were then stretched axially against the base of such cavity and expanded radially against the side walls to form the bottle shape.

Bottles thus formed were presented to a thickness measuring instrument manufactured by American Glass Research, Inc., of Butler, Penn., Model 2697-9-0062. This instrument was preset to reject bottles having a thickness in chime area 45 in FIG. 4 either below or above or which varied circumferentially beyond certain limits. These settings were 38 mils for minimum thickness and 70 mils for maximum thickness. Thickness variability was incorporated as a range based on the minimum thickness setting and was allowed to vary between 15% at the minimum setting of 38 mils to 30% at maximum setting value. These instrument setting values were obtained by measuring the performance of calibration bottles not made according to the present Example but which were determined by the values of (a) fill level drop, (b) lean from the vertical, (c) internal pressure strength and (d) impact resistance, to be acceptable as within established specifications for these properties, whereupon settings of the thickness monitroing instrument were determined which would discriminate in terms of chime thickness and variability levels between bottles equivalent to the calibration bottles and those which were not.

Such tests were as follows:

(a) Fill Level Drop — Bottles were filled with a carbonated cola beverage at 3.9 volumes $CO_2$ to a level of 3.5 cms. below the topmost surface of the finish, then capped and placed in an oven at 37.8° C. for 24 hours whereupon they were removed and allowed to return to room temperature. The unopened bottles were placed on a flat surface and the new fill level measured with the difference from the initial level being the actual fill level drop. The specification on maxium fill level drop was 3.8 cms. after exposure to the conditions noted.

(b) Lean — Each bottle was filled with a carbonated cola beverage at 3.9 volumes $CO_2$, capped and placed in an oven at 37.8° C. for 24 hours, removed and allowed to return to room temperature. The unopened bottles were placed on a flat, level surface and a dial gauge positioned adjacent each one, such gauge having a feeler resting against the bottle surface immediately beneath the finish designed to deflect with any deviation of such surface from vertical, and to indicate the magnitude of such deflection via a pointer on a face calibration in cms. Each bottle was then rotated 360° and the total difference between minimum and maximum pointer readings measure, the specification being no greater than 1.14 cms.

(c) Impact Resistance — Filled and capped bottles at room temperature were dropped once from a height of 1.0 meter at a 30° angle to the vertical onto a flat steel plate and the number passing noted, the specification being at least 50% of those dropped surviving without rupture.

(d) Burst Pressure — Bottles filled with tap water were clamped in place in an Americal Glass Research Incremental Pressure Tester and the internal pressure gradually increased until each bottle failed. Pressure at failure was noted, the specification on minimum pressure retention being 10.6 kg./cm.$^2$ When bottles made according to this Example were examined by the thickness instrument with the aforementioned settings, it was found that 97.8% of those tested were passed as acceptable.

EXAMPLE II

The procedure of Example I was repeated in forming the same bottle configuration and size from preforms having the same length, diameter and taper dimensions except that preform weight was reduced to 58 gms., which resulted in values for average thickness of 0.298 cm. and for the ratio of average thickness to body inside surface area of 0.0056 inch$^{-1}$ or 0.0022 cm.$^{-1}$ The heaters in the reheat oven were set as follows:

| Zone | 1 | 2 | 3 | 4 | 5 | 6 | 7 | 8 |
|---|---|---|---|---|---|---|---|---|
| Temperature (° C.) | 416.7 | 417 | 433 | 452 | 438 | 421 | 457 | 458 |

Residence time before the heaters was 120 seconds with conditioning time being about 60 seconds. On exiting the oven, shrink of the preforms was measured at about 13%.

Minimum and maximum values on the thickness measuring instrument were the same as for Example I but since the bottles of this Example were intended for single trip use in comparison with those of Example I, the maximum percentage variation was preset at 45%.

Of the bottles fabricated and presented to the thickness measuring instrument preset as stated, 94.5% were passed as acceptable.

EXAMPLE III

The procedure of Example I was repeated except that bottle size was proportionately reduced from 950 cc. to 475 cc. with the overall configuration being otherwise the same. This resulted in a bottle with a maximum diameter of 6.70 cms., a height of 21.6 cms., a weight of 39.5 gms., and a finish length of 1.42 cms. The dimensions of the preforms selected to be formed into such containers were as follows: total length 16.0 cms.; finish length 1.42 cms.; outside diameter (at location 20) 2.53 cms.; average thickness 0.333 cms; inside surface area 85.0 sq. cms.; average thickness/surface area 0.0099 inch$^{-1}$ or 0.0039 cm.$^{-1}$; axial stretch 38.3%; radial stretch 164.5%, total stretch 202.8%. The heaters in the oven were set as follows:

| Zone | 1 | 2 | 3 | 4 | 5 | 6 | 7 | 8 |
|---|---|---|---|---|---|---|---|---|
| Temperature (° C.) | 765 | 617 | 645 | 748 | 670 | 705 | 620 | 555 |

Residence time before the heaters was about 104 seconds with conditioning time of 52 seconds. On exiting the oven preform shrink was measured at 9%.

When bottles made from the preforms just described were examined to determine if they were within the thickness specifications of Example I it was found that 95% of those examined were acceptable.

The following Examples IV and V are provided for comparison purposes to illustrate the poor yield of acceptable bottles obtained when not operating in accordance with the invention.

EXAMPLE IV

The bottles had the same overall configuration as those in Example I except that maximum outside diameter D was 8.1 cms., the height was 26.7 cm., the weight was 49 gms., and the finish length was 1.68 cms. The preform selected weight 49 gms.; the total length before heating was 19.6 cms.; outside diameter (at 20) was 2.90 cms.; average thickness was 0.243 cms.; inside surface area was 138 sq. cms.; average thickness/body surface was 0.0045inch$^{-1}$ or 0.0018 cm.$^{-1}$; axial stretch was 40%; radial stretch was 172%; and total axial plus radial stretch was 212%. Heater settings in the reheat oven were:

| Zone | 1 | 2 | 3 | 4 | 5 | 6 | 7 | 8 |
|---|---|---|---|---|---|---|---|---|
| Temperature (° C.) | 394 | 347 | 363 | 365 | 329 | 329 | 333 | 338 |

Residence time before the heaters as preset above was 112 seconds with 56 seconds conditioning time. On exiting the oven preform shrinkage was determined to be 21%. On presentation of the resulting bottles to the thickness measuring instrument, set as in Example II, a yield of 56% of acceptable bottles was obtained. Such poor yield is believed due to excessive shrinkage during reheat which resulted in crossover of material from one preform zone intended for treatment by heaters of one temperature into adjacent heater zones set at different temperatures. Such poor temperature distribution at the time of remolding resulted in poor thickness distribution in the lower body portions of the resulting containers and low yields.

EXAMPLE V

The procedure of Example I is repeated except that preform dimensions are as follows: weight 65 gms, length 15.8 cms., outside diameter (at 20) 2.54 cms., average thickness 0.422 cms., body inside surface area 87.8 sq. cms. average thickness/inside body surface area 0.0122 inch$^{-1}$, or 0.0048 cm.$^{-1}$, axial stretch 77.6%, radial stretch 219% and total stretch stretch 296.6%.

When these preforms are heated via temperature programming with heater settings generally in accordance with those in Example I and with somewhat longer residence time to allow absorption of more heat by the relatively thick preform wall as reflected by the relatively high 0.0122 inch$^{-1}$ value, it is believed the percent shrinkage on exiting the oven will be about 3.8% which is an indication of a low stress level but because such preforms are relatively thick and short, the percent axial and radial stretch amounts to form the bottle are excessive such that the quality control limits on thickness in the lower body portions will be exceeded. Bottles formed by axially stretching and blowing the preforms of this Example in the amounts indicated herein on presentation to the thickness measuring instrument set as in Example I are believed to provide yields on the order of 40% acceptable bottles.

Various modifications and alterations will be readily suggested to persons skilled in the art. It is intended, therefore, that the following be considered as exemplary only and that the scope of the invention be ascertained from the following claims.

What is claimed is:

1. A method of forming containers from injection molded preforms of thermoplastic material which comprises:

providing preforms having predetermined dimensional characteristics such that shrinkage during heating to orientation temperature is maintainable within predetermined limits;

heating such preforms to such temperature through temperature programming by exposing the preforms to a plurality of separate heating zones disposed along the length thereof while maintaining shrinkage to between about 4 to 15% of the total initial preform length; and then axially and radially stretching such heated preforms at least about 30% and about 100% respectively while maintaining total % axial and radial stretch between about 130 to 280 to form the containers, whereby strength is developed and thickness variability minimized.

2. In the method of forming containers from injection molded preforms comprising a major proportion of a polymerized nitrile-group-containing monomer, which method includes heating the preforms to molecular orientation temperature through temperature programming by exposing the preforms to a plurality of separate heating zones disposed along the length thereof followed by axial and radial stretching to container form in a mold, the improvement, therein providing reduced thickness variability in lower portions of the containers which comprises, in combination, the steps of:

controlling shrinkage of the preforms during said heating to between about 4 to 15% of the total initial preform length; and then controlling said stretching according to the relation $$\% \text{ axial stretch } (A) = \frac{(\text{container length minus preform length})(100)}{\text{preform length minus preform neck finish length}}$$

$$\% \text{ radial stretch } (B) = \frac{(\text{maximum container diameter minus preform outside diameter})(100)}{\text{preform outside diameter}}$$

wherein:

A is at least about 30;

B is at least about 100; and

A plus B is between about 130 to 280.

3. The process of claim 2 wherein prior to heating the ratio:

$$\frac{\text{average preform thickness}}{\text{preform body inside surface area}}$$

is between about 0.005 to about 0.011 inch$^{-1}$.

4. The process of claim 2 wherein the preform comprises from about 50 to about 90 weight percent of a polymerized monomer selected from the group consisting of acrylonitrile, methacrylonitirle and mixtures thereof.

5. The process of claim 4 wherein the polymerized monomer is acrylonitrile.

6. The process of claim 5 wherein the preform comprises a 70/30 weight percent mixture of polymerized acrylonitrile/styrene.

7. In the method of forming containers from tubular, injection molded preforms comprising a major proportion of polymerized nitrile-group-containing monomer, which method includes heating the preforms to molecular orientation temperature through temperature programming by exposing the preforms to a plurality of separate heating zones disposed along the length thereof followed by axial and radial stretching in a mold to form the containers, the improvement which comprises:

(a) providing preforms prior to heating wherein the ratio of average preform thickness to inside preform surface area is between about 0.005 to about 0.011 inch$^{-1}$;

(b) controlling the amount of shrinkage of the preforms of step (a) during such heating to between about 4 to 15% of the total initial preform length; and then (c) controlling said stretching according to the relation:

$$\% \text{ axial stretch } (A) = \frac{(\text{container length minus preform length})(100)}{\text{preform length minus preform neck finish length}}$$

$$\% \text{ radial stretch } (B) = \frac{(\text{maximum container diameter minus preform outside diameter})(100)}{\text{preform outside diameter}}$$

wherein:

A is at least about 30;

B is at least about 100; and

A plus B is between about 130 to 280.

* * * * *